April 12, 1938. S. DECKER 2,113,575
METHOD OF MAKING STICK SUPPORTED CONFECTIONS
Original Filed Feb. 15, 1935
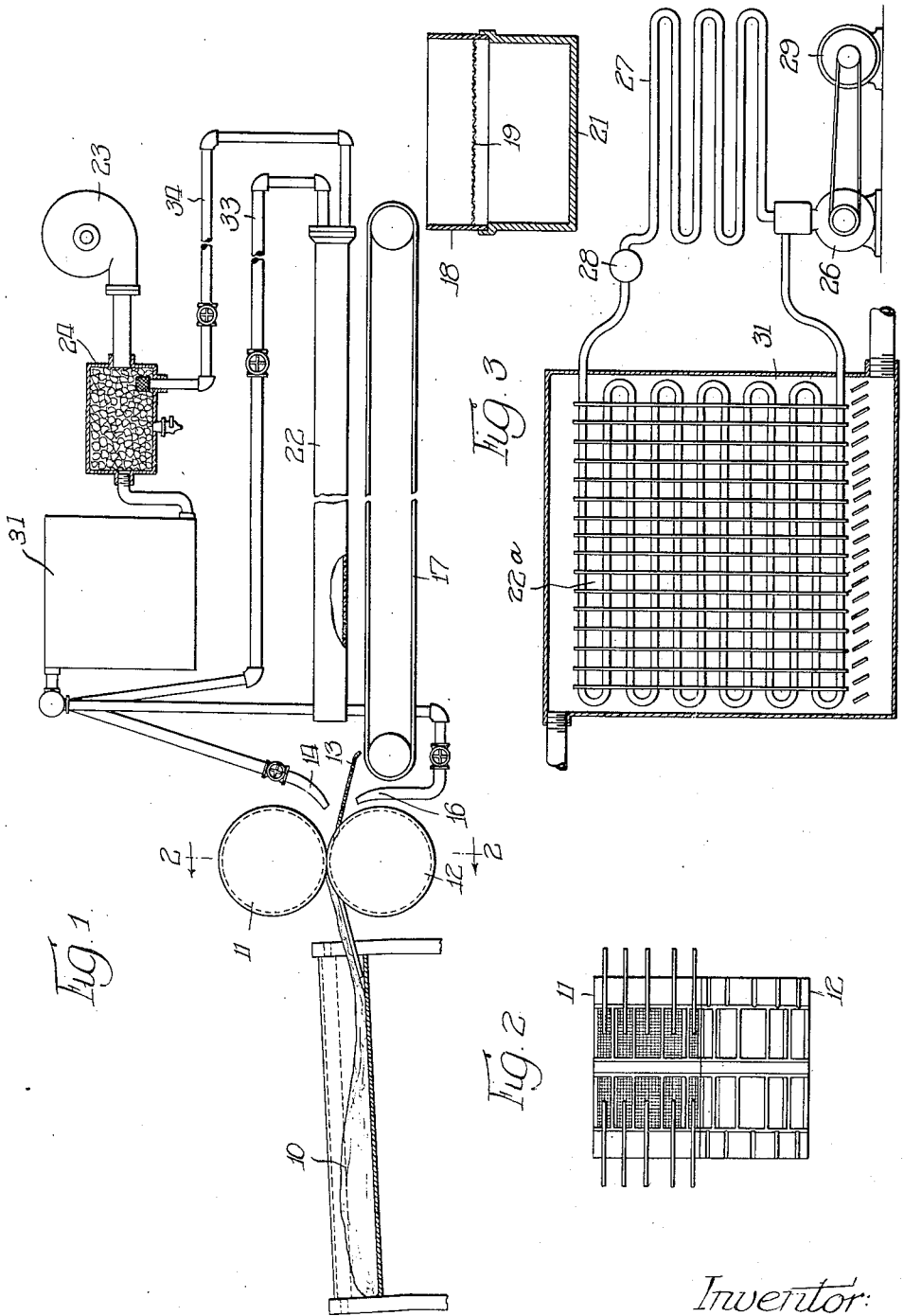
Inventor:
Sol Decker,
By John J. McLaughlin atty Patented Apr. 12, 1938

2,113,575

UNITED STATES PATENT OFFICE 2,113,575

METHOD OF MAKING STICK SUPPORTED CONFECTIONS

Sol Decker, Chicago, Ill.

Application February 15, 1935, Serial No. 6,626
Renewed July 9, 1937

2 Claims. (Cl. 107—54)

My invention relates to an improved method of producing edible confections. It relates also particularly to the manufacture of confections having supporting sticks of different types.

The illustrated confections consisting of a formed piece of hard candy, taffy and the like supported upon a stick imbedded therein, are made by forming the candy while in a warm, plastic condition about the supporting stick. Conventionally, semi-automatic machinery is employed for the purpose. One type of machine in common use is the so-called plunger type. In this type of machine, a turntable, equipped with molds distributed at equal distances in a circle about the turntable, rotates in a series of steps to place the molds successively beneath a plunger carrying a complementary mold part. A piece of plastic candy is cut off and fed to a mold in the turntable, and the mold is then brought to position beneath the plunger. As the plunger moves down to mold the candy between the two mold sections, a stick is automatically forced into the candy through an opening provided in the turntable and communicating with the mold.

In the roller type of confection forming machine, a pair of rolls are provided, one above the other, each carrying a number of mold sections. Slots in the rolls receive sticks automatically fed thereto so that the sticks project into the mold cavities. The candy is fed in a warm, semi-plastic condition to the molds at a point where they engage each other and the candy is continuously formed into shapes corresponding to the shape of the mold. The candy forms about the stick, and after the forming operation has been completed, the sticks and shaped candy bodies supported thereon are removed continuously and pass along a belt through a zone in which they are cooled sufficiently to make the candy somewhat brittle and permit the separation of the candy along the thin fin connecting successive pieces. This roll type of apparatus is also sometimes intermittent in action and sticks are forced into the candy in a way somewhat the same as the plunger type.

Difficulties are encountered in the operation of equipment of the types referred to, even when so-called inflexible sticks are employed. Unless the candy is of the proper consistency, the sticks will not be centered, or they may break. Moreover, the so-called semi-flexible sticks suggested in the past for use with stick supported confections as a safety precaution cannot be used on usual types of equipment. The candy will not form around them properly when the roller type of equipment is used and the stick is twisted or broken; and when the plunger type of equipment is used, the flexible stick does not have sufficient strength to permit its insertion in the candy.

Much of the difficulty encountered is due to the fact that the candy, when fed to the forming machine, must be cool enough to retain its shape when it is discharged from the mold. The range of temperature permitted, therefore, is relatively narrow, thereby introducing problems in the use of inflexible types of wooden sticks. Under no conditions of temperature or plasticity now capable of being used can the so-called flexible stick be employed with present types of equipment.

One object of my present invention is to provide an improved method for making stick supported confections.

Another object is the provision of a method for making lollipops which will permit the use of flexible supporting members on types of equipment now available.

Another object is the provision of a method by the practice of which sticks will be accurately centered in the candy, will not break or bend, and which will result in decreasing greatly the proportion of faulty products.

In carrying out my invention, I deliver the candy to the forming equipment in a very plastic and relatively hot condition. Under the conditions in which I deliver the candy to the forming machine, it will not have sufficient rigidity to maintain its shape after forming. Due to the comparatively fluid condition of the candy, however, even the most flexible supporting members can be inserted and truly centered without difficulty. As the candy is discharged from the mold, I project a blast of refrigerated air against it so as to immediately cool and congeal the outside surface, thereby absolutely retaining the shape imparted to the candy by the mold. By means of this combination of steps, I am able to produce high grade products employing flexible sticks, and the comparative number of imperfect products is very small. Although the process has its greatest utility in the production of confections having flexible supporting members, it offers advantages of control even when inflexible wooden sticks are used.

The temperatures which I employ when feeding my candy are in general considerably higher than temperatures now possible or customarily used. It is impossible to state accurately by means of figures what temperatures can be used under all conditions, because the temperature to be used in a particular case is determined in part by the character of the candy, the amount of moisture therein, the manner in which it is cooked, and the like. Those skilled in the art will understand that a standard type of hard candy employed for pertinent confections is cooked to about 280° F. in winter weather and up to 300° F. and higher during the summer months. It is customary to deliver the candy to the forming machine at about 140° F. and maintain it in a warm condition during the feeding process. Ordinarily, however, the temperature will be down to approximately 120° F. when the last of the candy is fed to the forming equipment.

In general I feed candy to the forming equipment at a temperature ranging from 40° to 50° higher than conventional practice, or under some conditions at still higher temperatures. The temperature should be such that the candy will be relatively very plastic when fed to the forming molds. It should not be hot enough to adhere to the molds. This very plastic candy forms readily about the stick, but usually it will not retain its shape when delivered from the molds even though contact therewith has cooled it somewhat. It is at this point, just as it is discharged from the molds, that the blast of refrigerated air, preferably at a temperature between about 15° and 25° F. is delivered against it. This immediately congeals the outside surface of the candy and causes it to retain its shape. The inside portion is also cooled, although more slowly, but the effect will be that the candy will not become deformed as it is delivered along the conveyor to receptacles provided to receive it. It should be noted that the air should not be cold enough to cause the candy to crack. Room conditions, the temperature to which the candy has been cooled and other factors should be taken into consideration in adjusting the temperature of the cooling or congealing air.

The refrigeration of the air takes out excess moisture, but the moisture may also be removed in other ways so that the air delivered to the candy is dry. In case the atmosphere of the room be very humid, moisture may have a tendency to condense out of the supercooled candy. To avoid this I may maintain it for some time in a dry atmosphere, thus preventing deposition of moisture on it. These features will be pointed out more fully as the description proceeds.

For the convenience of those skilled in the art, I have shown more or less schematically the manner in which the equipment is arranged for the practice of my process. In the drawing—

Fig. 1 is a longitudinal schematic view showing the main arrangement of the parts;

Fig. 2 is a sectional view taken along the line 2—2 of Fig. 1; and

Fig. 3 is a detail of the refrigerating unit.

Now referring to the drawing, the candy in a relatively very plastic condition is delivered to a table 10 of suitable type, where it is kept in a warm condition either by the use of steam coils, open gas jets, or other suitable means. Customarily at this point, if a batch roller be used, longitudinally disposed rollers are provided with a continuous belt of canvas loosely carried over them. The rollers are rotated and the candy disposed in the relatively slack canvas belt is continually rolled over so as to be kept at a substantially uniform temperature throughout. Other means may be employed for securing the same result.

Rollers 11 and 12 carry mold sections on their peripheries usually in one or two lines. Candy supporting sticks are delivered to slots provided in the roller 11. The candy, when delivered between the rollers, is received continuously into the molds and formed around the sticks.

By suitable means present in the illustrated type of equipment, the molded candy is removed from the rolls onto a platen 13. At this point, air nozzles 14 and 16 discharge blasts of air against both sides of the candy, the nozzle 16 being directed through a small opening provided in the platen 13. If desired, platen 13 may be a wire screen so that air can be delivered thru any portion thereof and projected against the candy. I do not find it necessary, under all conditions, to employ nozzles above and below the candy, one air blast suitably directed being sufficient under some conditions to chill the candy for the purpose of accomplishing the desired result.

When employing the type of equipment described, the formed pieces of candy are usually connected together by thin fins of candy so that the candy is delivered in the form of a continuous sheet of molded pieces, each having its supporting member embedded in it. This sheet of candy, or individual pieces, if the equipment is adjusted to form individual pieces, is delivered to a relatively long conveyor belt 17 which conveys the candy to suitable receiving means such as a receptacle 18 provided with a wire screen bottom 19. As the candy falls into the receptacle 18, small particles, such as the fins connecting individual pieces, fall through the screen into a lower receptacle 21. The candy is removed at proper times from the receptacle 18 and placed out on tables for further cooling, inspection and wrapping.

Above the conveyor belt 17 I provide a long pipe 22 having a continuous opening or a series of openings directed toward the candy on the belt 17. Cold dry air is delivered under pressure through the pipe 22 and is caused to be projected onto the candy. I show the pipe 22 connected to the same refrigerating system as that which delivers air to the nozzles 14 and 16. In general, however, the air delivered through pipe 22 need not be so cool and a separate refrigerating system may be employed.

The refrigerating equipment may be of standard type, the air being delivered past an expansion coil 22ª. Air is delivered by a blower 23. Preferably the air is dried, as for example by passing it through a container 24 containing hygroscopic material. Calcium chloride in relatively large pieces may be employed for this purpose or a naturally occurring material consisting of a mixture of chlorides known in some industries as calcium magnesium chloride.

With further reference to the refrigerating system, I utilize a suitable type of compressor 26, condenser 27 and expansion valve 28. The compressor is driven by a suitable motor 29. In the arrangement of the cooling coils I utilize the counterflow principle in which the air and refrigerant flow counter to each other in a closed chamber 31 housing the coils. This chamber is rectangular and the coils are finned so as to bring the maximum cooling surface into contact with the air. The drawing indicates three sets of expansion coils, but this is a matter of design, although the particular arrangement has given good results.

While I illustrate the use of a separate air drying unit, it should be noted that my refrigerating coils, particularly as arranged, remove a large amount of moisture. Due to the counterflow arrangement, the parts of the coils first contacted by the air are not quite cold enough to freeze water but they do chill the air sufficiently to cause condensation of moisture which is readily drained off. Now, when the colder portions of the coils are reached, the air, having already been freed of a great amount of moisture, will give up very little additional moisture and there will be very little "frost" formed. Thus the unit can be operated for quite a long time as a cooling and dehydrating unit, before it becomes necessary to "defrost" it. The use of a separate dehydrating unit still further increases the effective working time possible before servicing is necessary.

I have previously referred to the prevention of "sweating" of the candy which may occur under certain conditions on account of precipitation of moisture. This I avoid by maintaining the candy in a dry atmosphere until its temperature throughout attains a more balanced condition with respect to the room temperature.

I show two sources of dry air, one through pipe 33 from the refrigerating unit, and the other through pipe 34 from the separate drying unit 24. Each is provided with a valve, so that air may be delivered through either or both, depending on conditions encountered in operation. In operating the equipment I may withdraw my air from the outside, or I may withdraw it from positions near the nozzles 14 and 16, for example, to produce in effect a recirculation and deliver the air to the chamber 31 already pre-cooled. Any suitable means for securing this result may be employed.

It must not be inferred that my new process limits me to the use of any particular equipment. Any suitable candy forming mechanism can be used in which a supporting member or stick is imbedded in the candy by suitable and conventional means.

It must not be assumed that I am limited to the use of any particular type of stick or supporting member. As previously stated, ordinary inflexible wooden sticks can be advantageously used with my method, and with a smaller amount of imperfect goods. Wooden sticks which have been notched, knurled, or otherwise treated to produce a weak point where they will break readily in case of accident, can also be used. Any type of flexible or semi-flexible supporting stick-like member formed from paper or the like can be used very satisfactorily, such as the supporting members described in my co-pending application, Serial No. 743,038, filed September 7, 1934.

While I have described my invention in detail to teach those skilled in the art how to practice the same, it is obvious that many modifications and changes may be made within the scope of the appended claims. The terms candy, stick, support and the like employed in the claims are used in a general sense as employed in the specification.

I claim:

1. The method of producing a lollipop with a supporting stick which comprises providing a body of candy at an elevated temperature such that the candy is in a relatively plastic condition whereby it will not retain its shape, feeding the candy while in such condition into a mold and forming it with a stick embedded therein, discharging the candy and its associated stick from the mold while the candy is still in a condition whereby it will not retain its shape, and then, immediately upon the discharge from the mold, subjecting the candy to a relatively low temperature to congeal the outside surface thereof and cause it to retain its shape.

2. The method defined in claim 1 wherein the temperature of the candy fed into the mold is of the order of 160° F. or higher.

SOL DECKER.